Oct. 18, 1932.                 R. S. MOORE                 1,882,861
                        FEEDER FOR PULVERIZED MATERIALS
                       Filed Nov. 25, 1927        2 Sheets-Sheet 2

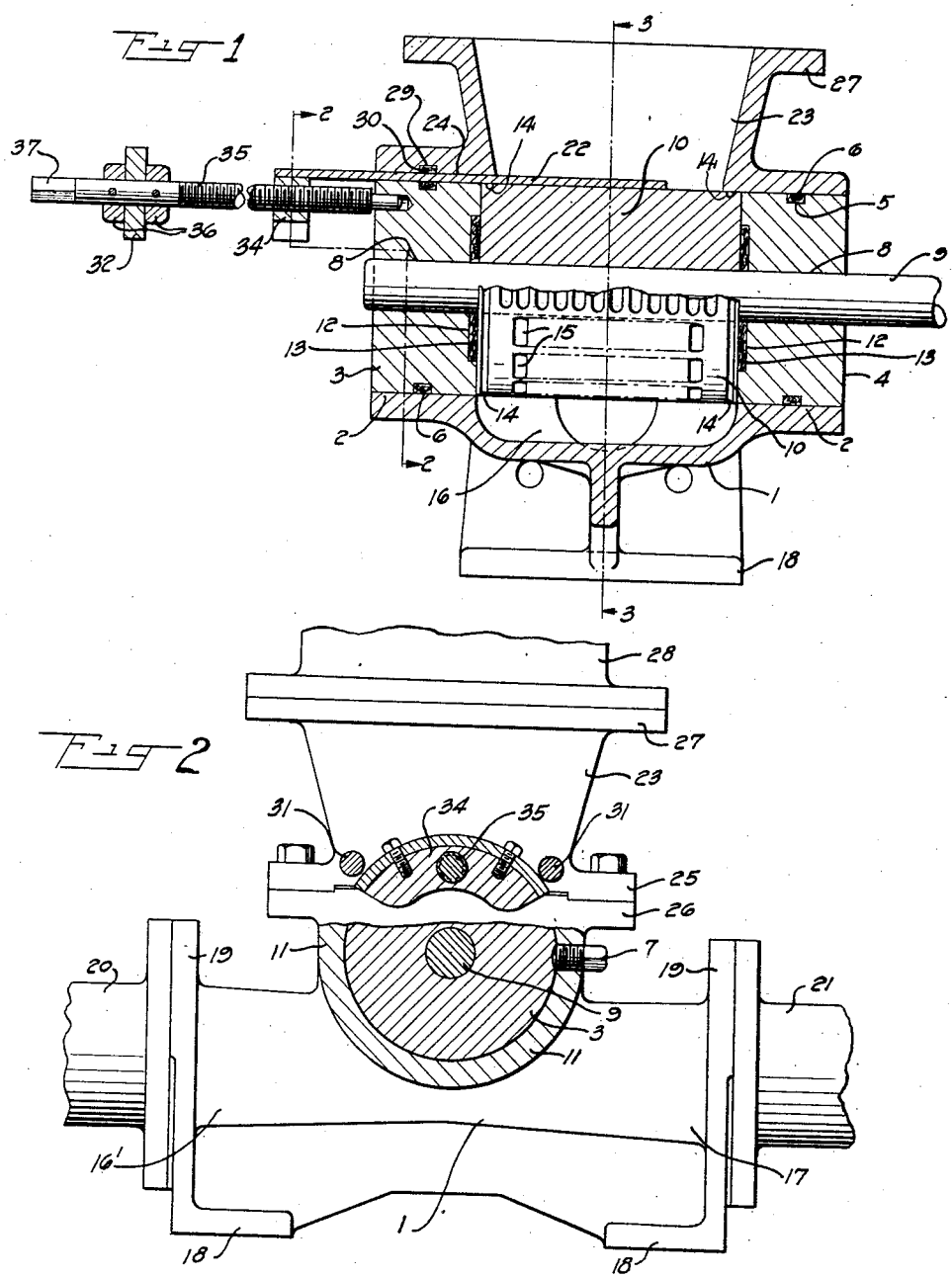

INVENTOR.
Ralph Switzer Moore
BY Albert M. Austin
ATTORNEY.

Patented Oct. 18, 1932

1,882,861

UNITED STATES PATENT OFFICE

RALPH SWITZER MOORE, OF EL PASO, TEXAS, ASSIGNOR TO AMERICAN SMELTING AND REFINING COMPANY, OF NEW YORK, N. Y., A CORPORATION OF NEW JERSEY

FEEDER FOR PULVERIZED MATERIALS

Application filed November 25, 1927. Serial No. 235,564.

The invention relates in general to feeders, and more particularly to a feeder for introducing pulverized materials into furnaces and the like.

The invention contemplates a novel and effective feeder for feeding pulverized or other materials into a furnace or other device without permitting free ingress or exit of gases. The feeder may be operated by a source of power at constant speed, and suitable devices may be provided for accurately controlling the amount of material fed. The feeder is simple in construction and operation and is not likely to become clogged by the material.

One form of feeder embodying the invention includes a casing having its upper end in the form of a hopper and having aligned conduits at its lower end. A drum is provided for rotation about an axis perpendicular to the conduits, the drum having recesses in its surface for carrying material from the hopper to the conduits. A suitable gate is provided, which is adjustable to cover different portions of the drum, to control the amount of material fed. A suitable draft may be applied through the aligned conduits to carry the material and to aid in preventing clogging.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation, partly in section of the feeder;

Fig. 2 is an end elevation, partly in section taken on the line 2—2 of Fig. 1;

Figure 3:
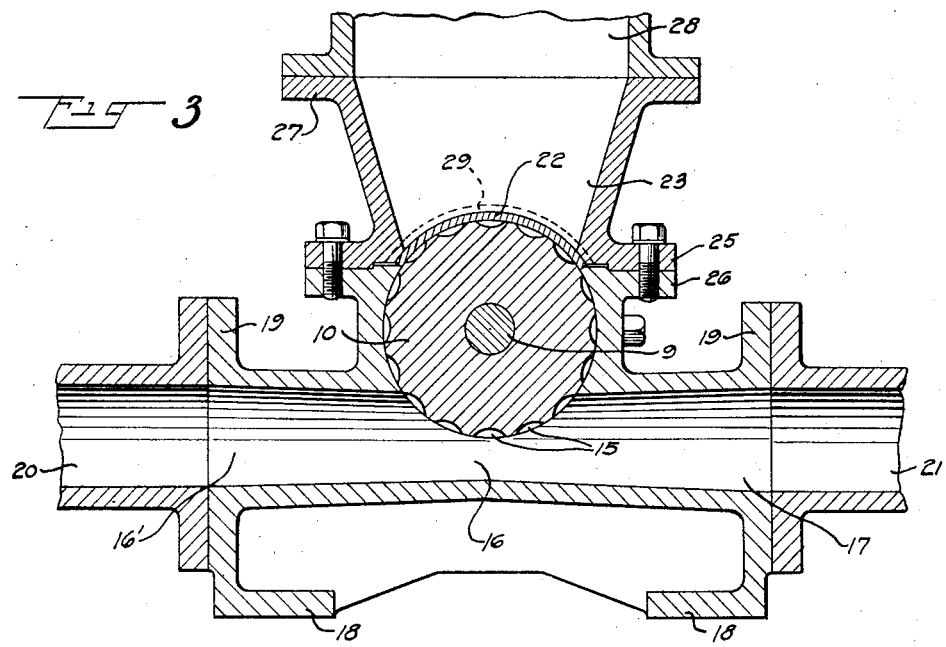
Fig. 3 is a section taken on the line 3—3 of Fig. 1.
Figure 4:
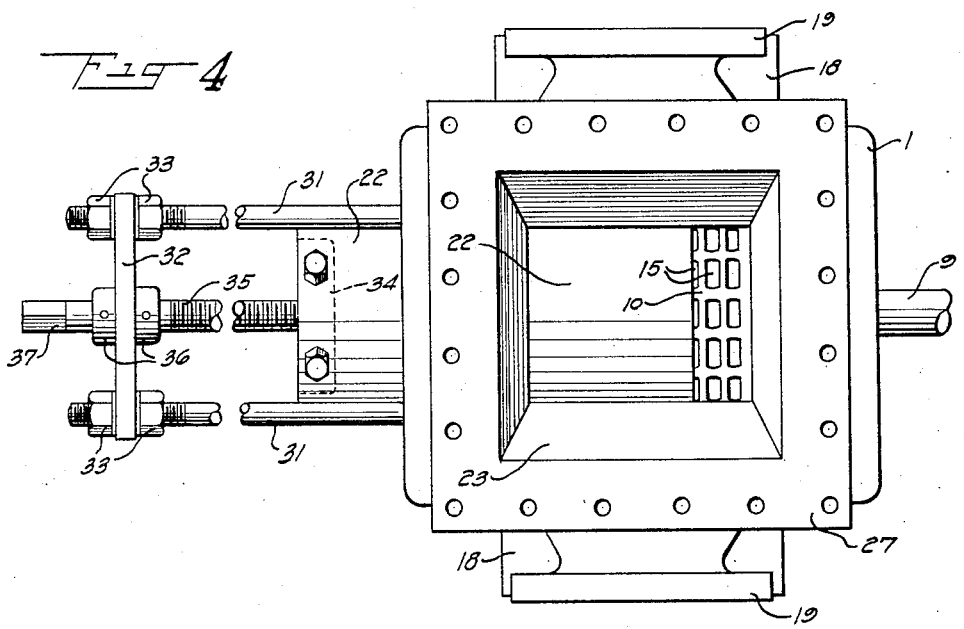
Fig. 4 is a top plan view.

In the following description and in the claims parts will be identified by specific names for convenience, but they are intended to be as generic in their application to similar parts as the art will permit.

Like reference characters denote like parts in the several figures of the drawings.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

In the particular embodiment shown, the device comprises a body 1 having circular open ends 2 and an open top. Circular disk walls 3 and 4 are provided fitting in the open ends, each disk wall having a groove 5 with packing material 6 therein. Suitable set screws 7 are provided for holding the disk walls in position.

The disk walls 3 and 4 are provided with aligned openings 8 to journal a shaft 9 having secured thereon a drum 10. The drum 10 is of the same diameter as the disk walls and closely fits them. The side walls 11 of the body 1 are curved also closely to fit the drum. The disk walls are provided with recesses 12 in which packing 13 material is provided for sealing purposes. The drum 10 is provided with annular end grooves 14 and a plurality of rows of shallow, circumferential recesses or pockets 15.

The lower part of the body 1 is provided with a chamber 16 in which the lower part of the drum projects, and also a pair of aligned conduits 16' and 17 extending perpendicular to the shaft 9. The body 1 is provided with suitable base flanges 18 for resting on a suitable support if desired, and suitable connecting flanges 19 for connection to inlet and outlet pipes 20 and 21. A jet of air is delivered to the inlet pipe 20 and the mixed air and charge passes through the outlet pipe 21.

Disposed over and fitting one disk wall 3 and the drum 10 is an arcuate gate 22. Secured to the upper end of the body 1 is a flaring hopper member 23 having a suitable recess 24 to provide space for the gate. The hopper member is provided with suitable flanges 25 for connection to cooperating flanges 26 on the body 1. The upper end of the hopper member 23 is provided with a suitable flange 27 for securing to a supply pipe 28 for conveying the material to be fed. The hopper member 23 is provided with an arcuate groove 29 disposed opposite the groove in the disk wall 3 and containing packing 30 for sealing purposes.

The mechanism for sliding the gate comprises a pair of supporting rods 31 fastened to the hopper member 23. A transverse yoke member 32 is secured by means of nuts 33 to the outer ends of the supporting rods 31. Depending from the gate 22 is a nut member 34. A threaded rod 35 is screwed into the nut member 34 and passes through the yoke 32, the end of the rod being journalled in the disk wall 3. Collars 36 are pinned to the rod 35 on opposite sides of the yoke and the outer end 37 of the rod is made non-circular to receive a hand wheel or crank (not shown) for operating the gate. It will be seen that rotation of the threaded rod 35 will cause the gate to cover or uncover the drum.

In operation, the drum 10, rotates at a constant speed driven from a suitable source of power. The hopper member 23 is filled with material to be fed and the gate 22 is opened an amount depending upon the desired rate of feed. As the drum rotates, the pockets 15 carry the pulverized material around to the lower chamber 16 where the material either drops to the floor of the chamber or is blown out of the pockets by means of the air draft blowing across the face of the drum. The pulverized material may be carried by the draft through the outlet pipe 21 into the apparatus it is desired to charge, which may be any sort of a furnace, such as a coal furnace, roasting furnace or reverberatory furnace. Any kind of material may be fed, as for instance, coal, coke, ore, etc. The drum may be rotated so that the lower part thereof travels either against or with the air draft.

Thus a feeder for pulverized or other material is provided which is simple in construction and efficient in operation. The initial cost is small and its upkeep is low. The device is driven at a constant speed and may be place upon the same shaft with a large number of other similar devices, no great care being required for its successful operation. The amount of material fed by each feeder is controlled independently of the others by its gate which may be adjusted with great ease. The arrangement is such that the apparatus cannot easily become clogged by the material. The apparatus is fed by the feeder in controlled amounts and at the same time is effectively sealed by the feeder against undesired ingress of air into the apparatus or escape of gases therefrom.

While certain novel features of the invention have been shown and described and are pointed out in the annexed claims, it will be understood that various omissions, substitutions and changes in the forms and details of the device illustrated and in its operation may be made by thos skilled in the art without departing from the spirit of the invention.

What is claimed is:

1. In a non-clogging feeder for feeding pulverized material to a furnace, a body having cylindrical side walls with end openings and a top feed opening, separate end walls secured in said end openings, a shaft passing through said end walls, a rotary drum on said shaft closely fitting said curved side walls and said end walls, said end walls and said drum being of substantially the same diameter, said drum having a plurality of fixed, small, shallow recesses in its cylindrical surface disconnected circumferentially and arranged serially around the drum, said body having a lower chamber in which the entire lower part of the drum is disposed, aligned inlet and outlet conduits communicating with said chamber and disposed at right angles to said shaft, said conduits converging from both ends toward said drum, an arcuate stationary gate disposed closely over one disk wall and said drum, and means for axially sliding said gate to cover any desired fraction of said drum from zero to maximum, whereby a tight seal is provided between said top opening and lower chamber and no free passage of said pulverized material is permitted and whereby the pockets of said drum are kept clean by the blast of air passing through said aligned conduits.

2. In a non-clogging feeder for feeding pulverized material to a furnace, a body having end walls and cylindrical side walls and a top feed opening, a shaft passing through said end walls, a rotary drum on said shaft closely fitting said curved side walls and said end walls, said drum having a plurality of fixed, relatively shallow recesses in its cylindrical surface disconnected circumferentially and arranged serially around the drum, said body having a lower chamber in which the entire lower part of the drum is disposed, an inlet air conduit and an outlet conduit communicating with said chamber and disposed transverse to said shaft, a stationary gate disposed closely over said drum at said feed opening, and means for sliding said gate axially to cover any desired fraction of said drum from zero to maximum, whereby a tight seal is provided between said top feed opening and lower chamber and no free passage of said pulverized material is permitted and whereby the pockets of said drum are swept clean by the blast of air passing through said inlet and outlet conduits.

In testimony whereof I have hereunto set my hand.

RALPH SWITZER MOORE.